United States Patent
Mikhalev et al.

[19]

[11] Patent Number: 5,954,342
[45] Date of Patent: Sep. 21, 1999

[54] MAGNETIC FLUID SEAL APPARATUS FOR A ROTARY SHAFT

[75] Inventors: Iouri Mikhalev; Serguei Lyssenkov, both of Ivanovo, Russian Federation

[73] Assignee: MFS Technology LTD, Israel

[21] Appl. No.: 08/846,038

[22] Filed: Apr. 25, 1997

[51] Int. Cl.[6] ............................. F16J 15/43; F01D 11/02
[52] U.S. Cl. ........................................ 277/410; 277/347
[58] Field of Search ................................. 277/347, 350, 277/410, 412, 417

[56] References Cited

U.S. PATENT DOCUMENTS

| | | |
|---|---|---|
| 3,612,549 | 10/1971 | Berkowitz ............................... 277/410 |
| 3,848,879 | 11/1974 | Hudgins .................................. 277/347 |
| 4,054,293 | 10/1977 | Hoeg et al. .......................... 277/347 X |
| 4,252,353 | 2/1981 | Raj et al. . |
| 4,290,610 | 9/1981 | Lizogub et al. ......................... 277/417 |
| 4,340,233 | 7/1982 | Yamamura et al. . |
| 4,357,022 | 11/1982 | Raj . |
| 4,357,023 | 11/1982 | Yamamura . |
| 4,357,024 | 11/1982 | Raj . |
| 4,407,508 | 10/1983 | Raj et al. . |
| 4,434,987 | 3/1984 | Albers et al. . |
| 4,444,398 | 4/1984 | Black, Jr. et al. . |
| 4,445,696 | 5/1984 | Raj et al. . |
| 4,506,895 | 3/1985 | Raj . |
| 4,592,557 | 6/1986 | Iversen . |
| 4,604,229 | 8/1986 | Raj et al. ............................ 277/410 X |
| 4,605,233 | 8/1986 | Sato . |
| 4,607,500 | 8/1986 | Bolton et al. . |
| 4,628,384 | 12/1986 | Raj et al. . |
| 4,630,943 | 12/1986 | Stahl et al. . |
| 4,681,328 | 7/1987 | Ritter et al. ............................. 277/347 |
| 4,696,481 | 9/1987 | Iversen . |
| 4,824,122 | 4/1989 | Raj et al. . |
| 4,827,454 | 5/1989 | Okazaki . |
| 4,830,384 | 5/1989 | Raj et al. . |
| 4,890,850 | 1/1990 | Raj et al. . |
| 4,927,164 | 5/1990 | Raj et al. ................................ 277/410 |
| 4,940,248 | 7/1990 | Kilthau et al. .......................... 277/410 |
| 4,989,885 | 2/1991 | Iwata et al. . |
| 5,011,165 | 4/1991 | Cap ........................................ 277/347 |
| 5,018,751 | 5/1991 | Raj et al. ................................ 277/410 |
| 5,050,891 | 9/1991 | Ishikawa . |
| 5,092,611 | 3/1992 | Ehmsen et al. . |
| 5,152,539 | 10/1992 | Takii et al. . |
| 5,156,523 | 10/1992 | Maier . |
| 5,161,902 | 11/1992 | Fujii . |
| 5,165,701 | 11/1992 | Koba ......................................... 277/80 |
| 5,660,397 | 8/1997 | Holtkamp ............................... 277/410 |

FOREIGN PATENT DOCUMENTS 84-080448 of 1984 U.S.S.R. ............................... 277/410

*Primary Examiner*—Anthony Knight
*Assistant Examiner*—Gary Grafel
*Attorney, Agent, or Firm*—Needle & Rosenberg, P.C.

[57] ABSTRACT

A single pole piece magnetic fluid seal apparatus, which includes a shaft sleeve, having magnetic properties, attached to and surrounding a shaft element to be sealed is provided The apparatus also includes single pole piece surrounding the shaft sleeve, proximate to and in non-contacting relationship with the shaft sleeve so as to define a radial gap between the pole piece and the shaft sleeve, The single pole piece includes first and second annular elements attached by a cross piece consisting of a third annular element, wherein the first, second and third annular elements define an annular channel therebetween. The apparatus also includes at least one magnet located within the annular channel and magnetic fluid disposed in the radial gap to provide a seal between the shaft sleeve and the pole piece. The magnet and the single pole piece provide a magnetic flux path through the pole piece, magnet, magnetic shaft sleeve and magnetic fluid.

27 Claims, 3 Drawing Sheets

MAGNETIC FLUID SEAL APPARATUS FOR A ROTARY SHAFT

FIELD OF THE INVENTION

The present invention relates to ferrofluid seals generally and more particularly to a ferrofluid magnetic seals.

BACKGROUND OF THE INVENTION

The use of magnetic fluid and ferrofluid seals for sealing emissions through rotary shafts is well known. Magnetic fluid or ferrofluid magnetic seals have been used as exclusion seals, where pressure differences on either side of the ferrofluid seal are insignificant, or as multiple stage seals, where there is a difference in pressure environment between the different sides of the seal.

Generally, multiple stage pole pieces are used in ferrofluid or magnetic seals to typically provide a seal about a rotating shaft between high and low pressure environments, for example, or to exclude contaminants from reaching a sensitive part of a device or an environment protected by the seal.

The typical design of a ferrofluid exclusion seal consists of a permanent magnet and two magnetic permeable pole pieces, with the magnetic-flux circuit completed through the magnetically permeable shaft, to be sealed.

Conventionally, ferrofluid seal is comprised of a precisely dimensioned ring-shaped permanent magnet, ring-shaped pole pieces and ferrofluid. The magnet is positioned around the shaft or bearing and the pole pieces are mechanically attached to the magnet faces and extend close to the shaft. The magnets do not touch the shaft and the gaps between are filled with ferrofluid.

The pole pieces are conventionally formed from a magnetically permeable metal and the ferrofluid is comprised of a suspension of magnetically permeable particles in a fluid carrier so that the pole pieces, the magnet, the ferrofluid and the shaft or bearing form a closed-loop magnetic circuit. The magnetic flux generated by the magnet passes through the ferrofluid and holds it in the gaps between the pole pieces and the shaft to form the seal. The construction and operation of such seals are described in detail in U.S. Pat. Nos. 4,407,508; 4,630,943; 4,628,384; and 4,357,022 and will not be discussed further herein.

U.S. Pat. No. 4,927,164 to Raj et al. describes a ferrofluid seal which comprises a magnet and at least one pole piece. The pole piece is fabricated from a ferromagnetic material which directly bonds to the magnet face, thereby eliminating the need for additional adhesive for enhanced seal integrity.

For example, U.S. Pat. No. 4,607,500 to Raj et al. describes a system in which a single-pole-piece ferrofluid exclusion seal is employed.

The single pole-piece ferrofluid seal apparatus of the invention consists of a single magnetically permeable pole piece, with the single pole piece at one end in a magnetic-flux relationship with a permanent magnet, and with the other end extending into a close, non-contacting relationship with the surface of the shaft element to be sealed. The small radial gap which is defined therebetween is filled with ferrofluid to provide the ferrofluid seal. The single pole piece is secured to the permanent magnet by bonding means.

The single pole-piece ferrofluid seal is unsuitable for providing a seal between high and low pressure environments. Furthermore, the single pole piece has a tendency to separate from the magnet.

U.S. Pat. No. 4,445,696 to Raj et al. describes a ferrofluid seal for use in high vacuum applications where one pole piece is separated from the shaft by ferrofluid seal, the other pole piece adjacent to the vacuum side filled with an epoxy non-magnetic type resin to reduce the air gap. Higher pressures "push" the ferrofluid seal away from the pole piece and the seal is unsuitable for pressure differences exceeding 6–7 psi.

Commonly, prior art ferrofluid and magnetic fluid seals used to seal emissions around a shaft, for example, are attached to the end flange of the mechanical seal, away from the bearings supporting the shaft. Because of the length of the shaft and of the cumulative effect of all vertical and horizontal dimensional imperfections, the resulting shaft eccentricity affects adversely the performance of the seal. The performance of the magnetic fluid seal depends on the ability to maintain a constant gap between the rotating shaft and the magnetic pole pieces. In the presence of distortions, this gap must be at least equal to the sum of the gap required and the magnitude of the shaft distortions. Consequently, the farther the seal is located from the shaft bearing support, the larger must be the gap between the shaft and the magnetic pole pieces. This in turn, affects the maximum pressure which the magnetic fluid seal is able to withstand. Prior art solutions, such as U.S. Pat. No. 4,445,696, are restricted to a maximum permissible pressure of 6 psi per module width. Since the minimum required pressure in a typical petro-chemical application is at least 20–25 psi, four modules would have to be used making it unsuitable for retrofit applications or for pumps not having sufficient space for more than one unit.

Also, this additional seal length would add further to the cumulative shaft distortions requiring a larger still gap size for the magnetic fluid. Since there is a cubic relationship between the gap size and the seal size, that is doubling the gap size requires an eight-fold increase in the seal volume, space limitation on existing pumps becomes a decisive factor.

Furthermore, the use of multiple modules significantly increases the costs of the seals.

SUMMARY OF THE INVENTION

An object of the present invention is to provide a ferrofluid magnetic seal which overcomes the limitations and disadvantages of prior art units.

A further object of the present invention is to provide a ferrofluid magnetic seal utilizing a single pole piece which overcomes the limitations and disadvantages of prior art single pole pieces.

A yet further object of the present invention is to provide a ferrofluid magnetic seal which is suitable for high temperature and for high pressure differences between the different sides of the seal.

The seal arrangement of this invention represents a secondary seal which eliminates any gas and vapor emissions released through a typical mechanical seal. A further novel feature of this invention is that it also seals off any oil leakage from the pump's bearing box. Gases and vapors are sealed off using a magnetic fluid seal while the oil leakage is prevented through the use of a labyrinth seal—both incorporated into a single unit.

There is thus provided, in accordance with a preferred embodiment of the present invention, a single pole piece magnetic fluid seal apparatus, which includes a shaft sleeve attached to and surrounding a shaft element to be sealed, (the shaft sleeve having magnetic properties), a single pole piece surrounding the shaft sleeve, proximate to and in non-contacting relationship with the shaft sleeve so as to define a radial gap between the pole piece and the shaft sleeve, The single pole piece includes first and second annular elements attached by a cross piece consisting of a third annular element, wherein the first, second and third annular elements define an annular channel therebetween. The apparatus also includes at least one magnet located within the annular channel and magnetic fluid disposed in the radial gap to provide a seal between the shaft sleeve and the pole piece. The magnet and the single pole piece provide a magnetic flux path through the pole piece, magnet, magnetic shaft sleeve and magnetic fluid. The shaft being sealed may extend between high-pressure and low-pressure environments.

In one embodiment a plurality of magnets are placed in the annular channel.

Furthermore, in accordance with a preferred embodiment of the present invention, the shaft sleeve includes a plurality of protrusions affixed thereto. The protrusions, in one embodiment, are triangular shaped having an acute angle. The acute angle provides a frictional bond with the magnetic fluid.

Furthermore, in accordance with a preferred embodiment of the present invention, the apparatus is placed proximate to the shaft support bearing thereby to reduce the effect of linear and radial shaft distortions.

Additionally, in accordance with a preferred embodiment of the present invention, the magnet is a samarium-cobalt (SmCo$_5$) magnet and has a residual magnetic induction of 7700 Gauss. The magnetic fluid has a viscosity in the range of about 200–550 cps.

Furthermore, in accordance with a preferred embodiment of the present invention, the apparatus also includes an O-ring seal between the shaft sleeve and the shaft being sealed.

Additionally, there is also provided, in accordance with a preferred embodiment of the present invention, a sealing module for sealing a shaft in an environment subject to gaseous vapors. The sealing module includes a single pole piece magnetic fluid seal (having components claimed herein) and a labyrinth seal, proximate to the magnetic fluid seal at the downstream end of the gaseous vapors, for preventing the escape of the gaseous vapors.

A sealing module according to claim 11 and wherein the labyrinth seal includes a metal ring and disc.

Furthermore, in accordance with a preferred embodiment of the present invention, the sealing module further includes a mechanical seal proximate to the upstream end of the magnetic fluid seal, an "O"-ring seal for sealing the shaft sleeve.

Furthermore, in accordance with a preferred embodiment of the present invention, the sealing module further includes a chamber formed proximate to the upstream end of the magnetic fluid seal to contain any gaseous vapors escaping through the mechanical seal. The sealed chamber is formed by attaching a metal cylinder between the magnetic fluid seal at one end and the mechanical seal at its other end. The sealed chamber may also include at least one opening for extracting the gaseous vapors and at least one conduit to monitor gaseous vapors escaping through the magnetic fluid seal.

In addition, there is also provided, in accordance with a preferred embodiment of the present invention, a method for providing a seal about a rotating shaft The method includes the steps of:

a) attaching to and surrounding the shaft with a shaft sleeve having magnetic properties;

b) surrounding the shaft sleeve with a single pole piece, proximate to and in non-contacting relationship with the shaft sleeve so as to define a radial gap between the pole piece and the shaft sleeve, the single pole piece includes first and second annular elements attached by a cross piece includes a third annular element, wherein the first, second and third annular elements define an annular channel therebetween; the annular channel containing at least one magnet;

c) sealing the shaft by employing magnetic fluid in the radial gap to provide a seal between the shaft sleeve and the pole piece; and d) providing a magnetic flux path through the pole piece, magnet, magnetic shaft sleeve and magnetic fluid.

Additionally, there is also provided, in accordance with a preferred embodiment of the present invention, method for sealing a shaft in an environment subject to gaseous vapors. The method includes the steps of:

a) attaching to and surrounding the shaft with a shaft sleeve having magnetic properties;

b) surrounding the shaft sleeve with a single pole piece of magnetically permeable material, proximate to and in non-contacting relationship with the shaft sleeve so as to define a radial gap between the pole piece and the shaft sleeve;

c) sealing the shaft by employing magnetic fluid in the radial gap to provide a seal between the shaft sleeve and the pole piece;

d) providing a magnetic flux path through the magnetically permeable pole piece, magnetic shaft sleeve and magnetic fluid; and e) surrounding the shaft with a labyrinth seal, proximate to the magnetic fluid seal at the downstream end of the gaseous vapors, for preventing the escape of the gaseous vapors.

Furthermore, in accordance with a preferred embodiment of the present invention, the method further includes providing a mechanical seal proximate to the upstream end of the magnetic fluid seal. In accordance with an embodiment of the invention, the method also includes forming a chamber proximate to the upstream end of the magnetic fluid seal to contain any gaseous vapors escaping through the mechanical seal. There is at least one opening for extracting the gaseous vapors from the chamber.

Furthermore, in accordance with a preferred embodiment of the present invention the method also provides at least one conduit for monitoring gaseous vapors escaping through the magnetic fluid seal.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present applicants have realized that by attaching a sleeve, having magnetic properties to the shaft being sealed, an improved magnetic fluid seal may be constructed.

Figure 1:
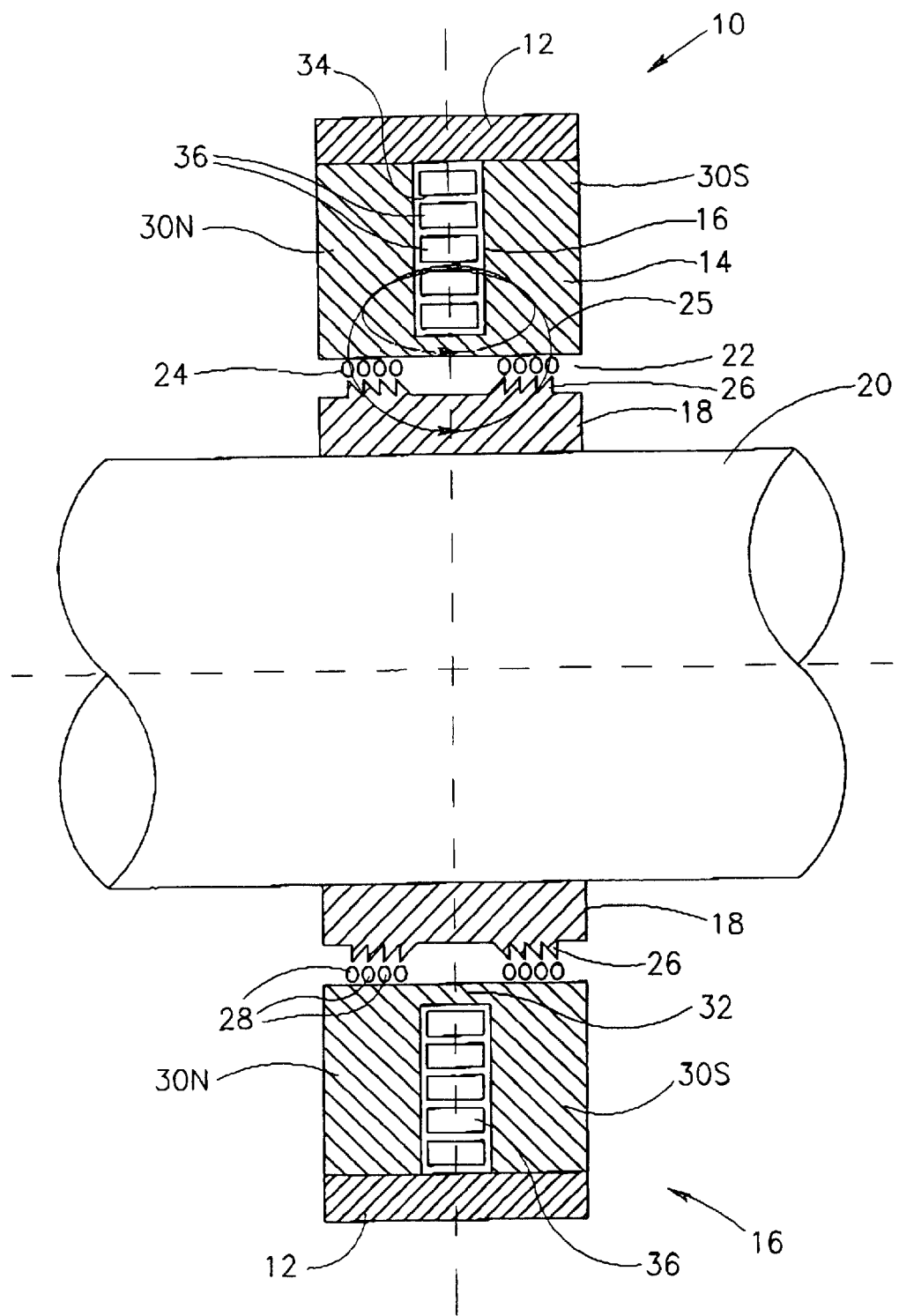
FIG. 1 is a schematic illustration of the flux circuit of a magnetic fluid seal, constructed and operative in accordance with a preferred embodiment of the present invention.

Reference is made to FIG. 1, which illustrates the flux circuit of a magnetic fluid seal, generally designated 10, constructed and operative in accordance with a preferred embodiment of the present invention.

Magnetic fluid seal 10 comprises a housing 12 containing a single pole piece 14 and a magnet 16. Magnetic fluid seal 10 further comprises a magnetic shaft sleeve, generally designated 18, which is attached to the shaft 20 being sealed. Pole piece 14 is located close to but not in contact with shaft sleeve 18 so as to define a radial gap 22 between the pole piece 14 and the shaft sleeve 18. The radial gap 22 is filled with magnetic fluid 24. The magnetic flux path is schematically illustrated (lines 25), as extending through the pole piece 14, the magnet 16, magnetic shaft sleeve 18 and magnetic fluid 24.

The magnetic shaft sleeve 18 is attached to the shaft 20 by any suitable means, such as a set screw and is preferably sealed by means of an O-ring (not shown), or similar.

Magnetic fluid seal 10 is preferably placed proximate to and attached to the shaft support bearing housing (not shown), thereby to effectively act as an extension of the bearing surface and thus reduce the linear and radial distortions to the shaft.

The radial gap 22 depends on various factors, such as the shaft diameter, speed of rotation and is preferably between 0.1 to 0.3 mm.

Figure 2:
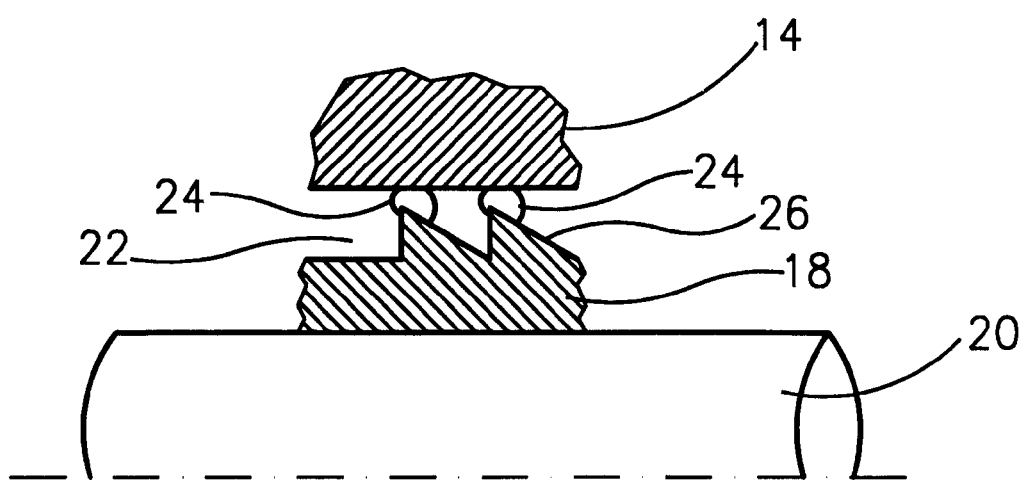
FIG. 2 is an enlarged detail of the magnetic fluid seal.

Reference is now also made to FIG. 2, which is an enlarged detail of the magnetic fluid seal showing the connection between pole piece 14, shaft sleeve 18 and magnetic fluid 24.

The magnetic shaft sleeve 18 comprises a plurality of protrusions 26 affixed thereto. The plurality of protrusions 26 act as magnetic field concentrators, that is, the magnetic fluid 24 is concentrated about the plurality of protrusions 26 to form a plurality of separate seals 28. Protrusions 26 are preferably triangular shaped having a right-angled configuration, as shown. The acute angle of the triangular shape provides a stronger frictional bond with the magnetic fluid 24 and thus a better seal. It will be appreciated by persons knowledgeable in the art that protrusion may have any suitable shape, such as rectangular ridges.

It will be further appreciated, by persons knowledgeable in the art, that by placing the protrusions 26 on a separate sleeve 18 attached to the shaft being sealed the radial gap 22 being sealed is between the magnetic pole piece 14 and the sleeve 18. This arrangement is in contrast to prior-art solutions which have placed protrusions on the pole pieces themselves, thereby creating a gap between the shaft itself and the pole piece which must be sealed. The advantage of the arrangement of the present invention is that the magnetic shaft sleeve 18 can be fabricated from any suitable material having good magnetic properties. The performance of the ferro-magnetic seal is independent of the material of the shaft 20. Thus, the magnetic fluid seal 10 of the present invention is suitable for use with any shaft material, including non-magnetic materials, such as PVC.

The construction of the single pole piece 14 is a feature of the invention in that it comprises a generally "U"-shape cross-section, having two 'legs', referenced 30N and 30S, attached by a relatively narrow cross-piece 32. Thus, though pole piece 14 is a single unit, the two 'legs', 30N and 30S, effectively act similar to a pair of pole pieces, having North and South poles, respectively, as will be described hereinbelow.

The use of a single pole piece avoids the need to join and hermetically seal two separate pole pieces, thereby eliminating the problem of thermal properties and thermal distortions. Although there is a slight loss of magnetic flux, the effect on the seal's ability to withstand a given pressure drop is minimal (between 1.5–3.0 percent).

The magnet 16 comprises an annular channel 34 between pole 'legs', 30N and 30S into which is inserted at least one permanent magnet, generally designated 36. It is a feature of the invention and a preferred embodiment thereof, that a plurality of smaller magnets, may be inserted in annular channel 34. The permanent magnet (or plurality of magnets) 36 are dimensioned to tightly fit within channel 34. An exemplary type of magnet is a samarium-cobalt ($SmCo_5$) magnet, having the following characteristics:

| | |
|---|---|
| 1. Residual magnetic Induction | 7700 gauss |
| 2. Coercive Force | 6750 oersted |
| 3. Maximum Magnetic Field energy | $1.38 \times 10^7$ gauss-oersted |

It will be appreciated that any suitable magnet having similar characteristics which permit operation up to 100° C., may be used.

It will be further appreciated, by persons knowledgeable in the art, that the use of a single pole piece having an annular channel in which are inserted a plurality of smaller magnets has the advantage of effectively creating a ring of magnets without the need for adhesive or other bonding material. Thus, the problems associated with the deterioration of adhesives due to time and temperature (one of the main disadvantages of prior art seals) are eliminated.

Preferably, the magnetic fluid 24 should be capable of performing satisfactorily in a high magnetic field of 18,000 oersted. Exemplary characteristics for magnetic fluid are:

| | |
|---|---|
| 1. Density | 1.25 to 1.6 g/cm |
| 2. Viscosity | <550 cps |
| 3. Saturation Magnetization | >500 oersted. |

Principle of Operation

The magnets 36, placed in the annular channel 34 of pole piece 14 together with the magnetic shaft sleeve 18, create a closed magnetic circuit with a magnetic field, (illustrated by lines 25) concentrated along the cylindrical triangular protrusions 26 on the surface of the magnetic sleeve 18. Any magnetic fluid 24 inserted into the gap 22 between the sleeve 18 and the pole piece 14 will fill the gap 22 and stay in position under the influence of the magnetic field.

It will be appreciated, that the magnetic fluid seal of the invention may be used in any application requiring a seal capable of withstanding high temperatures and pressures, such as the petrochemical industry. For example, the magnetic fluid seal 10 may be used to effectively seal off gases and vapors escaping a mechanical seal. Furthermore, the magnetic fluid seal 10 is also effective in sealing off reactive materials.

Generally, escaping gases generate a high pressure. The magnitude of the pressure which the magnetic seal is able to withstand is a function of the magnetic properties of the magnetic fluid 24, the magnitude of the magnetic flux in the seal gap 22 and of the number of triangular protrusions 26 along the length of the seal. The seal of this invention was tested over a period of six months, at temperatures of 80° C. at 3,000 rpm and was found to withstand pressures up to 42 psi without adverse affects.

Figure 3:
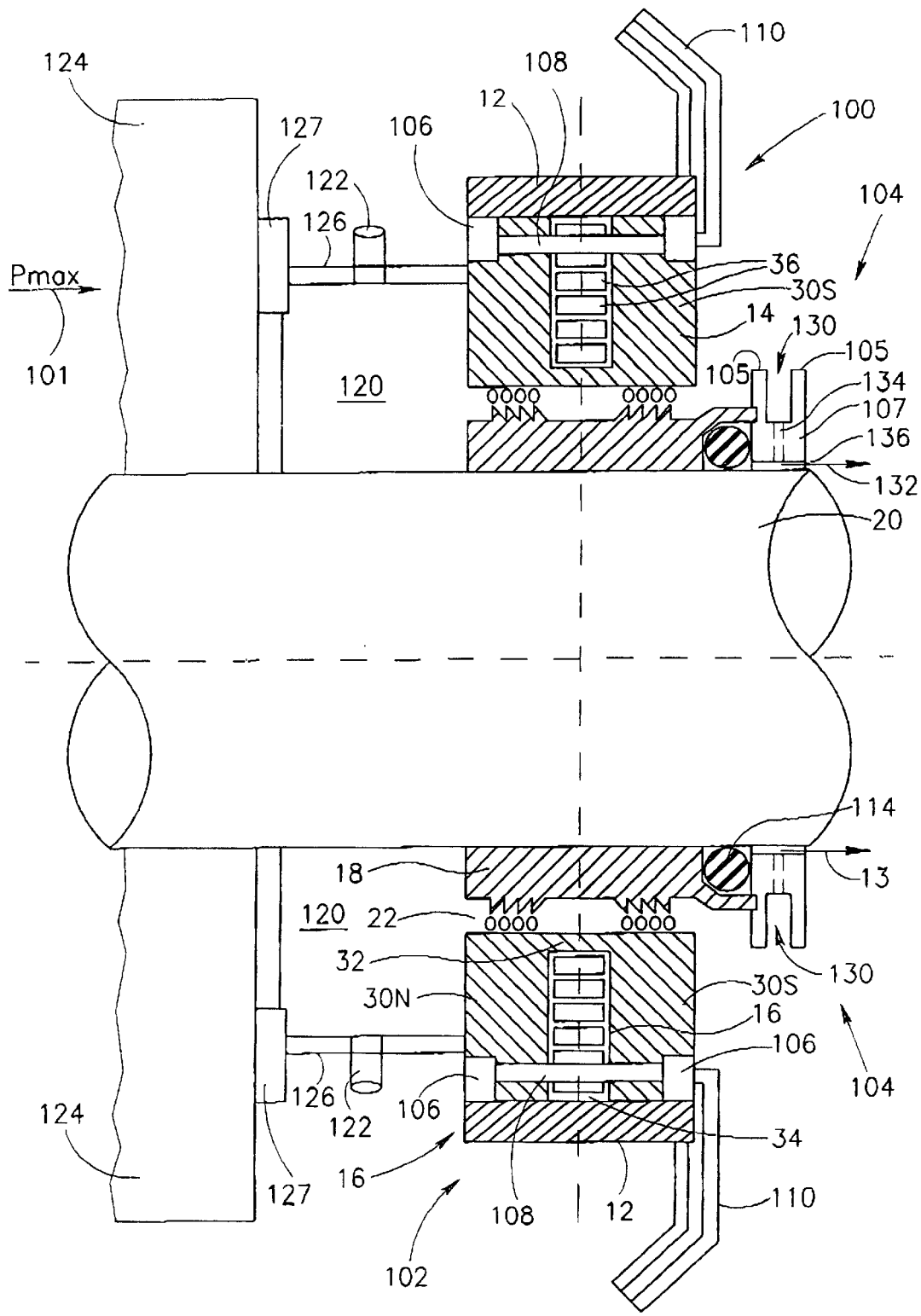
FIG. 3 is a schematic illustration of a sealing module comprising the magnetic fluid seal of FIG. 1, constructed and operative in accordance with a preferred embodiment of the present invention.

Reference is now made to FIG. 3 which illustrates a sealing module, generally designated 100, constructed and operative in accordance with a preferred embodiment of the present invention. Sealing module 100 utilizes a magnetic fluid seal of FIG. 1.

By way of example only, sealing module 100, is shown placed in an environment subject to gases at high pressure. The upstream end subject to high pressure ($P_{max}$) is indicated by arrow 101. Sealing module 100 comprises a magnetic fluid seal, generally designated 102 and a labyrinth seal, generally designated 104.

Magnet seal 102 is similar to magnetic fluid seal 10, described hereinabove with respect to FIG. 1, comprising a housing 12, a single pole piece 14, a magnet 16, and a magnetic shaft sleeve 18, which is attached to the shaft 20 being sealed. Pole piece 14 is located close to but not in contact with shaft sleeve 18 so as to define a radial gap 22 between the pole piece 14 and the shaft sleeve 18.

Elements of this embodiment of the invention which are similar to elements which have been previously described with respect to the preferred embodiment hereinabove, are similarly designated and will not be further described.

In addition, sealing module 100 further comprises flow channels 106 formed on the inner surface of housing 12. Flow channels 106 are connected by a second channel 108 to channel 110, respectively.

Magnetic shaft sleeve 18, which is suitably attached to shaft 20, is sealed by means of an "O"-ring seal 114, or similar.

Labyrinth seal 104 comprising a metal ring 105 and disc 107 (schematically illustrated), or similar arrangement, is located proximate to "O"-ring seal 114 at the low pressure end of the magnetic fluid seal 102. Any oil mist (indicated by arrow 130), coming from the shaft bearing box (not shown) is trapped between the rings 105 of the labyrinth seal 104 and returned to the bearing box, as indicated by arrow 132, via an orifice 134 and channel 136 integrally formed within the disc 107. Labyrinth seal 104, which separates gas and vapors at the low pressure end of the seal 102 from the bearing lubrication, prevents penetration of the bearing lubrication oil into magnetic fluid seal 102. Any oil mist (indicated by arrow 130), coming from the shaft bearing box (not shown) is trapped between the rings 105 of the labyrinth seal 104 and returned to the bearing box, as indicated by arrow 132, via an orifice 134 and channel 136 integrally formed within the disc 107.

A sealed chamber 120, sealed by means of "O"-ring seals, or similar, is formed proximate to magnetic fluid seal 102 to contain any gases escaping through the mechanical seal 124. Sealed chamber 120 is formed by attaching a metal cylinder 126 to the magnetic fluid seal 102 (at one end) and by means of a flange 127 to mechanical seal 124 (at its other end). An opening 122 can be provided as an outlet for any escaped gases which can be conducted to a central storage cylinder, flare-off or be re-circulated back to the process.

At the low pressure end (downstream) of the magnetic fluid seal 102, channels (not shown) can be provided to monitor any gases or vapors passing through the fluid seal 102.

Thus, the use of a storage chamber 120 at the outlet of the mechanical seal allows for the collection of any gases escaping the mechanical seal. In addition, storage chamber 120 can also provide a means of collecting any liquid that may escape the mechanical seal in case of malfunction of the mechanical seal thus eliminating spillage and giving early warning to the operator that the mechanical seal has broken down.

It will be appreciated that the present invention provides a seal which can be adapted to almost any pump.

It will be further appreciated that the present invention is not limited by what has been described hereinabove and that numerous modifications, all of which fall within the scope of the present invention, exist. Rather the scope of the invention is defined by the claims which follow:

We claim:

1. A single pole piece magnetic fluid seal apparatus comprising:

a. a shaft sleeve attached to and surrounding a shaft to be sealed, said shaft sleeve having magnetic properties, wherein said shaft is attached to a shaft support bearing housing;

b. a single pole piece surrounding said shaft sleeve, proximate to and in non-contacting relationship with said shaft sleeve so as to define a radial gap between the pole piece and said shaft sleeve, said single pole piece having a substantially unitary construction, said unitary construction having a substantially "U" shaped configuration, said substantially "U" shaped configuration defined by first and second outer portions and a third portion intermediate said first and second outer portions, wherein said first, second and third portions define an annular channel and wherein said first and second outer portions are radiating outwardly with respect to said third portion;

c. at least one magnet located within said annular channel; and d. magnetic fluid disposed in the radial gap to provide a seal between said shaft sleeve and said pole piece;

wherein said at least one magnet and said single pole piece provide a magnetic flux path through the pole piece, magnet, magnetic shaft sleeve and magnetic fluid.

2. The seal apparatus according to claim 1 and wherein said at least one magnet comprises a plurality of magnets.

3. The seal apparatus according to claim 1 and wherein said shaft sleeve comprises a plurality of protrusions affixed thereto.

4. The seal apparatus according to claim 3 and wherein each of said plurality of protrusions are triangular shaped having an acute angle, said acute angle providing a frictional bond with said magnetic fluid.

5. The seal apparatus according to claim 1 and placed proximate to said shaft support bearing housing thereby to reduce the effect of linear and radial shaft distortions.

6. The seal apparatus according to claim 1 and wherein said magnet is a samarium-cobalt ($SmCo_5$) magnet.

7. The seal apparatus according to claim 1 and wherein said magnet has a residual magnetic induction of 7700 Gauss.

8. The seal apparatus according to claim 1 and wherein said magnetic fluid has a viscosity in the range of about 200–550 cps.

9. The seal apparatus according to claim 1 and further comprising an O-ring seal between said shaft sleeve and said shaft being sealed.

10. The seal apparatus according to claim 1 and wherein said shaft being sealed extends between a first high-pressure and second low-pressure environment.

11. A sealing module for sealing a shaft in an environment subject to gaseous vapors, said sealing module comprising:

a. a single pole piece magnetic fluid seal, said magnetic fluid seal comprising:

a shaft sleeve attached to and surrounding a shaft to be sealed, said shaft sleeve having magnetic properties, wherein said shaft is attached to a shaft support bearing housing;

a single pole piece surrounding said shaft sleeve, proximate to and in non-contacting relationship with said shaft sleeve so as to define a radial gap between the pole piece and said shaft sleeve, said single pole piece having a substantially unitary construction, said unitary construction having a substantially "U" shaped configuration, said substantially "U" shaped configuration defined by first ad second outer portions and a third portion intermediate said first and second outer portions, wherein said first, second and third portions define an annular channel and wherein said first and second outer portions are radiating outwardly with respect to said third portion;

at least one magnet located within said annular channel; and magnetic fluid disposed in the radial gap to provide a seal between said shaft sleeve and said pole piece;

wherein said at least one magnet and said single pole piece provide a magnetic flux path through the pole piece, magnet, magnetic shaft sleeve and magnetic fluid; and b. a labyrinth seal, proximate to said magnetic fluid seal at the downstream end of said gaseous vapors, for preventing the escape of said gaseous vapors.

12. A sealing module according to claim 11 and further comprising a mechanical seal proximate to the upstream end of said magnetic fluid seal.

13. A sealing module according to claim 11 and further comprising an "O"-ring seal for sealing said shaft sleeve.

14. A sealing module according to claim 12 and further comprising a chamber formed proximate to the upstream end of said magnetic fluid seal to contain any gaseous vapors escaping through said mechanical seal.

15. A sealing module according to claim 14 wherein said sealed chamber is formed by attaching a metal cylinder between said magnetic fluid seal at one end and said mechanical seal at the other end of said metal cylinder.

16. A sealing module according to claim 15 and wherein said sealed chamber further comprises at least one opening for extracting said gaseous vapors.

17. A sealing module according to claim 11 and further comprising at least one conduit to monitor gaseous vapors escaping through said magnetic fluid seal.

18. A sealing module according to claim 11 and wherein said at least one magnet comprises a plurality of magnets.

19. A sealing module according to claim 11 and wherein said shaft sleeve comprises a plurality of protrusions affixed thereto.

20. A sealing module according to claim 11 and wherein said shaft being sealed extends between a first high-pressure and second low-pressure environment, wherein said labyrinth seal is located at the low-pressure end.

21. A method for providing a seal about a rotating shaft, said method comprising the steps of a. attaching to and surrounding the shaft with a shaft sleeve having magnetic properties;

b. surrounding said shaft sleeve with a single pole piece, proximate to and in non-contacting relationship with said shaft sleeve so as to define a radial gap between the pole piece and said shaft sleeve, said single pole piece having a substantially unitary construction, said unitary construction having a substantially "U" shaped configuration, said substantially "U" shaped configuration defined by first and second outer portions and a third portion intermediate said first and second outer portions, wherein said first, second and third portions define an annular channel and wherein said first and second outer portions are radiating outwardly with respect to said third portion; said annular channel containing at least one magnet;

c. sealing the shaft by employing magnetic fluid in the radial gap to provide a seal between said shaft sleeve and said pole piece; and d. providing a magnetic flux path through the pole piece, magnet, magnetic shaft sleeve and magnetic fluid.

22. A method for sealing a shaft in an environment subject to gaseous vapors, said method comprising the steps of a. attaching to and surrounding the shaft with a shaft sleeve having magnetic properties;

b. surrounding said shaft sleeve with a single pole piece of magnetically permeable material, proximate to and in non-contacting relationship with said shaft sleeve so as to define a radial gap between the pole piece and said shaft sleeve, said single pole piece having a substantially unitary construction, said unitary construction having a substantiality "U" shaped configuration, said substantially "U" shaped configuration defined by first and second outer portions, and a third portion intermediate said first and second outer portions, wherein said first, second and third portions define an annular channel and wherein said first and second outer portions are radiating outwardly with respect to said third portion; said annular channel containing at least one magnet;

c. sealing the shaft by employing magnetic fluid in the radial gap to provide a seal between said shaft sleeve and said single pole piece;

d. providing a magnetic flux path through the magnetically permeable pole piece, magnetic shaft sleeve and magnetic fluid, and e. surrounding said shaft with a labyrinth seal, proximate to said magnetic fluid seal at the downstream end of said gaseous vapors, for preventing the escape of said gaseous vapors.

23. A method according to claim 22 and wherein said single pole piece comprises first and second annular elements attached by a cross piece comprising a third annular element, wherein said first, second and third annular elements define an annular channel therebetween; said annular channel containing at least one magnet.

24. A method according to claim 22 and further comprising providing a mechanical seal proximate to the upstream end of said magnetic fluid seal.

25. A method according to claim 24 and further comprising providing forming a chamber proximate to the upstream end of said magnetic fluid seal to contain any gaseous vapors escaping through said mechanical seal.

26. A method according to claim 25 and further comprising providing at least one opening for extracting said gaseous vapors from said chamber.

27. A method according to claim 22 and further comprising providing at least one conduit and monitoring gaseous vapors escaping through said magnetic fluid seal.

* * * * *